United States Patent [19]
Lender et al.

[11] 3,993,953
[45] Nov. 23, 1976

[54] APPARATUS AND METHOD FOR DIGITALLY GENERATING A MODIFIED DUOBINARY SIGNAL

[75] Inventors: Adam Lender, Palo Alto; Henry H. Olszanski, Belmont, both of Calif.

[73] Assignee: GTE Automatic Electric Laboratories Incorporated, Northlake, Ill.

[22] Filed: Oct. 17, 1975

[21] Appl. No.: 623,292

[52] U.S. Cl. .............................. 325/38 A; 178/68; 340/347 DD
[51] Int. Cl.² ....................................... H03K 13/24
[58] Field of Search........... 178/68; 325/38 R, 38 A, 325/42, 141; 340/347 DD

[56] References Cited
UNITED STATES PATENTS

| | | | |
|---|---|---|---|
| 3,456,199 | 7/1969 | Van Gerwen | 325/38 R |
| 3,457,510 | 7/1969 | Lender | 178/68 |
| 3,515,991 | 6/1970 | Lender | 325/38 R |
| 3,569,955 | 3/1971 | Maniere | 325/38 A |
| 3,601,702 | 8/1971 | Lender | 178/68 |
| 3,679,977 | 7/1972 | Howson | 325/42 |
| 3,866,147 | 2/1975 | Couvreur et al. | 325/38 A |
| 3,919,476 | 11/1975 | Torpie | 178/68 |
| 3,920,898 | 11/1975 | Torpie | 178/68 |

Primary Examiner—Robert L. Griffin
Assistant Examiner—Marc E. Bookbinder
Attorney, Agent, or Firm—Leonard R. Cool; Russell A. Cannon

[57] ABSTRACT

A binary signal is first digitally transformed to obtain both an altered binary signal and its complement. The altered and altered complementary signals are next each delayed by two bit intervals of the original waveform to obtain both delayed altered and delayed altered complementary signals in binary form. Then, the altered and delayed altered complementary signals are gated to obtain the first gated binary output signal wherein a second level output signal is obtained whenever the two input signals are both first level signals and the first gated signal is a first level signal for all other input combinations. The altered complementary and delayed altered signals are similarly gated to obtain a second gated output signal in binary form. Finally, the first and second gated output signals are compared to obtain a three-level digital modified duobinary signal.

10 Claims, 3 Drawing Figures

APPARATUS AND METHOD FOR DIGITALLY GENERATING A MODIFIED DUOBINARY SIGNAL

BACKGROUND OF THE INVENTION

1. Field of the Invention

This invention relates to binary data transmission systems wherein the bit rate of the binary data exceeds that at which intersymbol interference would occur. More particularly, the invention relates to method and apparatus for digitally converting a binary signal into a modified duobinary signal.

2. Description of the Prior Art

Duobinary systems are explained, for example in an article appearing in IEEE Transactions on Communications and Electronics, vol. 82, May 1963, pp. 214 – 218, as well as a variety of generally available publications. In particular, the duobinary system is disclosed and claimed in U.S. Pat. No. 3,238,299 entitled, "High-Speed Data Transmission System" by the present inventor. Subsequent publications by the present inventor have disclosed a number of variations in the basic duobinary concepts. The duobinary technique, as originally developed, contemplated a baseband three-level, correlative level-coded signal in which the amplitude of the wave increased with decreasing frequency, reaching a maximum value at a frequency which was essentially zero. Important among the additional publications of interest is the article entitled, "Correlative Digital Communication Techniques", appearing in IEEE Transactions on Communications Technology, vol. 13, June 1965, pp. 203 – 208. In addition, a number of correlative level-coded techniques are described in U.S. Pat. No. 3,388,330 entitled, "Partial Response Multilevel Data System". More particularly, a technique for converting a binary signal into a modified duobinary signal and the particularities of the characteristics of the modified duobinary signal are described in considerable detail in U.S. Pat. No. 3,457,510 entitled, "Modified Duobinary Data Transmission" by the present inventor. U.S. Pat. No. 3,457,510 is incorporated herein by reference.

It is important to note first that the conversion filter of the subject U.S. Pat. No. 3,457,510 comprises a bandpass filter having zero transmission at zero frequency and at $2f_1$ Hz. The maximum transmission occurs at the frequency $f_1$ Hz. Further, the conversion of the correlative two-level signal is accomplished by filtering or shaping of the two-level signal. In contrast, the correlative level-coded modified duobinary waveform of the present invention is accomplished solely by means of digital techniques.

SUMMARY OF THE INVENTION

The invention contemplates an apparatus and method for digitally processing a binary pulse train to obtain a modified duobinary signal. The binary signal is first digitally transformed into an altered binary pulse train having each bit correlated with the second preceding bit. Next, the transformed binary pulse train is digitally converted into a three-level digital waveform having extreme levels representing a first signal level of said binary pulse train and a center level representing the second signal level of said binary pulse train.

DETAILED DESCRIPTION OF THE INVENTION

Figure 1:
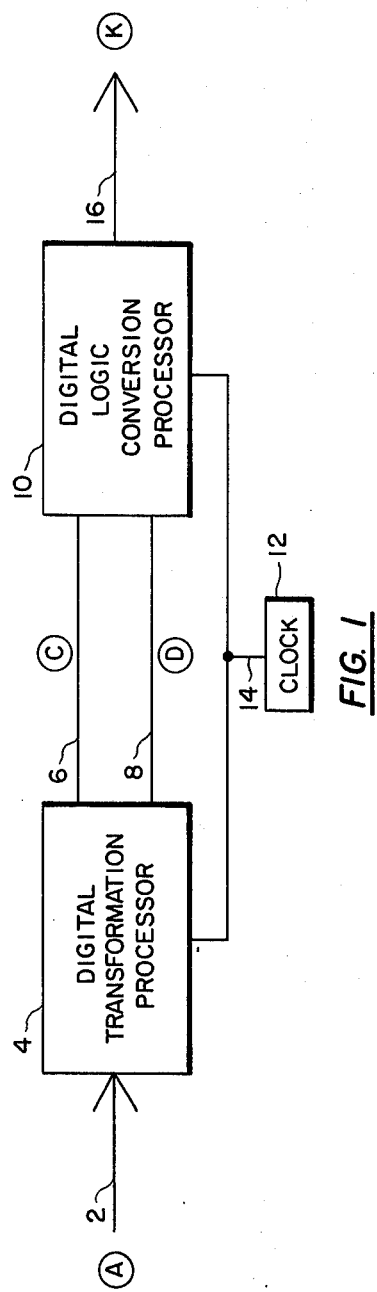
FIG. 1 is a generalized block diagram showing the basic elements of the invention.
Figure 2:
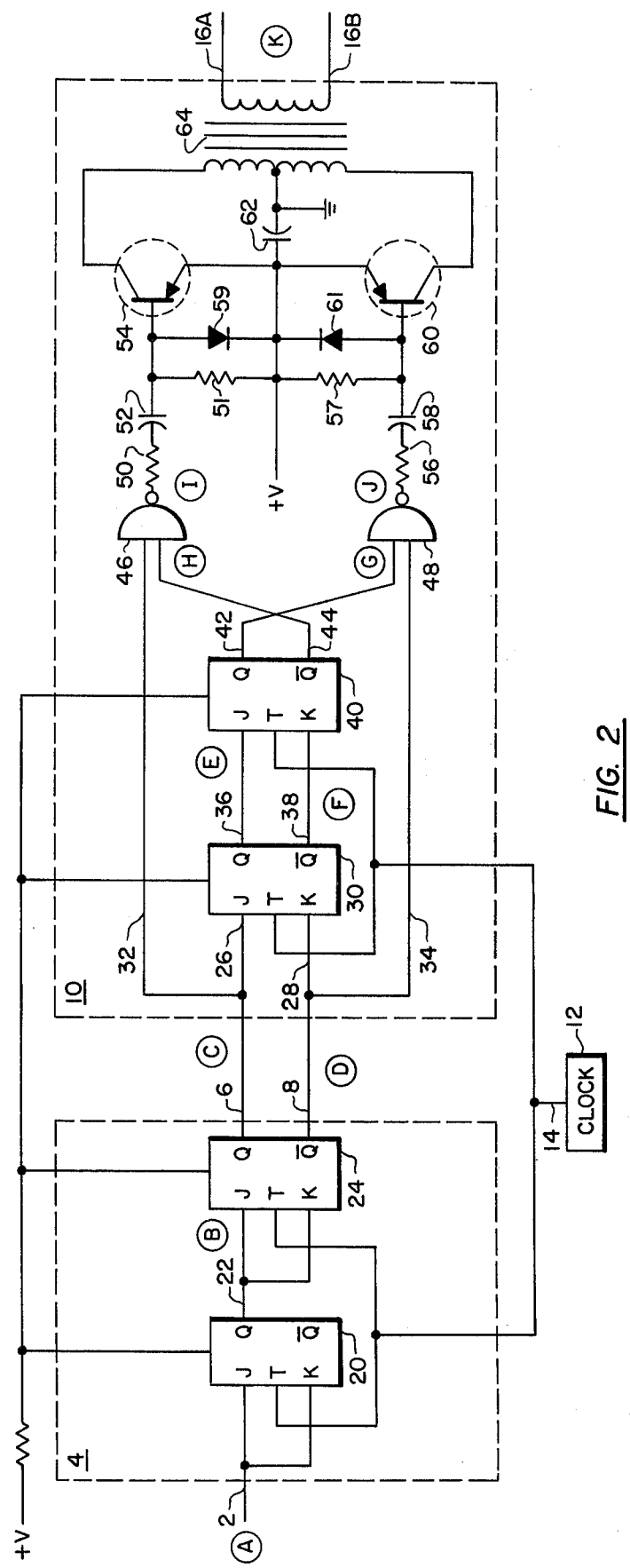
FIG. 2 is a detailed schematic diagram showing a preferred embodiment of the invention for digital generation of the modified duobinary waveform from a binary input signal.
Figure 3:
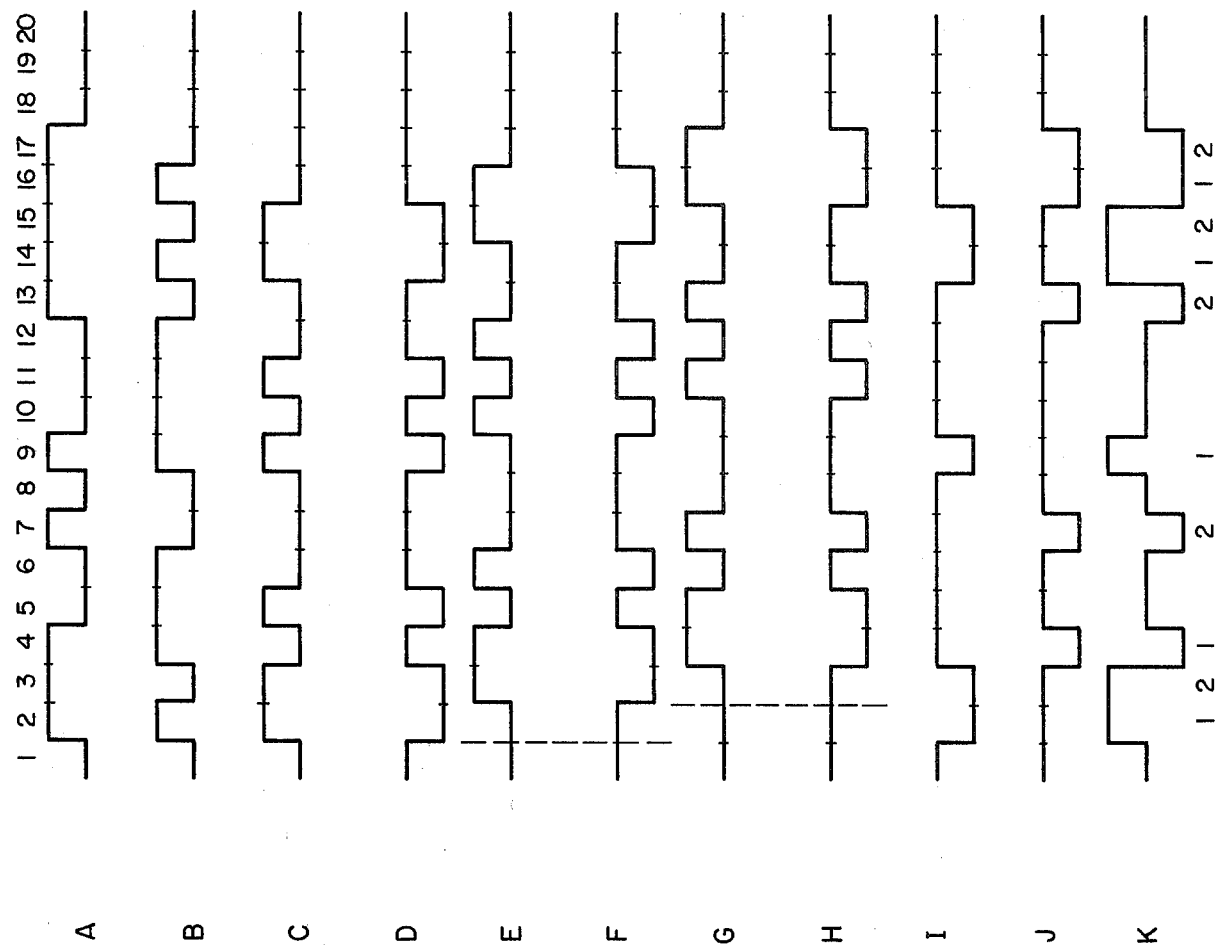
FIG. 3 is a waveform diagram which shows the processing of the binary signal as it travels through the various steps in the digital generation process to obtain the modified duobinary waveform.

With respect to FIGS. 1 and 2, the letters in the circles designate the waveforms and refer to waveforms having the same respective letter as given in FIG. 3. The generalized block diagram of FIG. 1 illustrates the digital process wherein a binary signal is changed into a modified duobinary signal. A binary input such as illustrated at A, FIG. 3, is applied at input 2 and is transformed in digital transformation processor 4 into an altered signal which is also binary in form but is transformed so that the present bit is correlated with the second bit back from any particular bit in question. The altered binary signal appears on output lead 6 and is shown as waveform C in FIG. 3. The altered complementary signal appears on lead 8 and is shown at D in FIG. 3. The altered and complementary altered signals are applied to the input of digital logic conversion processor 10 where they are converted into digital modified duobinary signals on output lead 16 as is shown in waveform K of FIG. 3. Clock timing is applied by clock 12 via lead 14 to the digital transformation processor 4 and digital logic conversion processor 10. The clock rate is equal to the binary data rate.

A preferred embodiment of the invention is shown in FIG. 2 in which the binary input signal is applied via lead 2 to a J-K masterslave flip-flop combination. The binary input signal from lead 2 is applied simultaneously to both the J and K inputs of flip-flop 20, and a partially alternate binary signal is obtained from the Q-output of the flip-flop on lead 22. The partially altered signal which is shown as waveform B, FIG. 3, is applied simultaneously to the J and K inputs of flip-flop 24. The transformed signal, which is the altered binary form of the input binary signal applied to input lead 2 to the transformation processor 4, is outputted on lead 6 from the Q-output of flip-flop 24. The altered complementary waveform is outputted from Q-output of flip-flop 24 via lead 8. The altered and complementary altered forms of the binary signal are shown as waveforms C and D, respectively, in FIG. 3. These are applied via leads 6 and 8 to the digital logic conversion processor 10.

The altered and complementary altered binary signals are next each delayed by two digits in the masterslave J-K flip-flop, which consists of flip-flops 30 and 40. The altered waveform is applied via lead 26 to the J-input of flip-flop 30, while the altered complementary binary signal is applied via lead 28 to the K-input of flip-flop 30. Referring to FIG. 3, it may be seen that the altered waveform which appears at lead 36 from the Q-output of flip-flop 30 is delayed by one bit interval, and the altered complementary output appearing on lead 38 from the Q̄-output of flip-flop 30 is delayed by one bit as shown in waveform F, FIG. 3. The Q and Q̄-outputs are applied, respectively, to the J and K inputs of flip-flop 40, and the delayed altered and complementary delayed altered binary signals, each signal being delayed by two digits, appear at the Q and Q̄-outputs of flip-flop 40 on leads 42 and 44, respectively.

The altered and complementary delayed altered binary signals are applied to the inputs of NAND-gate 46. The complementary altered and the delayed altered binary signals are applied to the inputs of gate 48. The outputs of gates 46 and 48 are shown as waveforms I and J, respectively, of FIG. 3, and these are combined through the transistor circuits associated with transistors 54 and 60 and via transformer 64 to obtain a digitally generated modified duobinary output signal which appears on leads 16A and 16B. A digitally generated modified duobinary signal is as shown at waveform K in FIG. 3. Referring to the U.S. Pat. No. 3,457,510, incorporated herein by reference, it may be seen that waveform K is the digital equivalent of waveform F, FIG. 1, of the referenced patent. It will be seen that in both cases the extreme levels of the wave represent or correspond to the first level or MARK condition of the input binary waveform A. The intermediate, middle or center level of waveform F of the reference or K of the instant inverter represents the second level or SPACE condition of binary input signal A. Note further that the modified duobinary signal of F or K follows a predetermined set of rules. These rules may be readily realized by grouping all of the successive MARKS in pairs and assigning the pair number to each MARK as illustrated in FIG. 3. Successive MARKS are indicated by numerals 1 or 2, with a repetition of this numbering for the next pair of MARKS. A MARK bearing number 1 in a pair of two successive MARKS will be seen to always have the opposite polarity relative to the previous MARK which, of course, carries the number 2. The polarity of the MARK identified by number 2 relative to the previous MARK bearing number 1 is governed by a set of odd and even rules as in a straight duobinary system and method. More specifically, if the number of intervening spaces between a pair of MARKS numbered 1 and 2 is even, then the polarities of these MARKS are the same. If the number of intervening spaces between a pair of MARKS numbered 1 and 2 is odd, then the polarities of these two MARKS are opposite. A correlation of properties of the waveform K produced in accordance with the present invention permits the ready detection of errors in received and transmitted data.

An understanding of the apparatus and method of digitally generating a modified duobinary signal may also be obtained by relating the circuit structure to a mathematical analysis of the problem. Note that in the following discussion the waveform symbols A through K are used to designate the character of the input of various points within the circuit as shown in FIG. 3. This was done to simplify the mathematical presentation. Let us consider the output stage consisting of two NAND gates 46 and 48; resistors 50, 51, 56, and 57; capacitors 52 and 58; diodes 59 and 61; transistors 54 and 60; and transformer 64. Input G is delayed by two unit intervals from input C. Hence $$G = \Delta^2 C \tag{1}$$

where $\Delta$ indicates one unit delay T seconds long and 1/T is the speed in bits per second. Then $\Delta^2$ indicates two units delay. Input D is merely the inverse of C and may be denoted as $$D = \bar{C}. \tag{2}$$

Input H is then $\Delta^2 D$, or in terms of C, from (2)

$$H = \Delta^2 \bar{C} \text{ (inverse of G or inverse of } \Delta^2 C). \tag{3}$$

Consequently, four possible conditions may exist at the inputs to the NAND-gates and they are expressed in terms of C, i.e., C, $\bar{C}$, $\Delta^2 C$ and $\Delta^2 \bar{C}$. The process of conversion is in general $(C - \Delta^2 C)$ where the minus indicates conventional algebraic subtraction. The four possible results of such a subtraction are shown in Table I, remembering that C and $\Delta^2 C$ can assume only binary values, namely "1" or "0".

TABLE I

| C | G or $\Delta^2 C$ | $C - \Delta^2 C$ |
|---|---|---|
| 0 | 0 | 0 |
| 0 | 1 | −1 |
| 1 | 0 | +1 |
| 1 | 1 | 0 |

Let us assume that C and $\Delta^2 C$ (or G) are both "0". When C = G = 0, then H = D = 1. A NAND-gate with inputs C = 0 and H = 1 would normally have a positive pulse output. However, the diode 59 in parallel with resistor 51 prevents this pulse from occurring and clamps it to value +V. Hence, transistor 54 stays in the cutoff condition, and there is no output pulse at K. Similarly for the NAND-gate 48. It follows that for C = $\Delta^2 C$ = 0 in Table I there is no output (indicated by "0"), and the center level of the modified duobinary signal appears at K, corresponding to binary "0" at the input A. When C = G = 1 in Table I, H = D = 0. Again, both NAND-gates would normally have a positive output pulse, but this does not occur because of the action of diodes 59 and 61. The diodes clamp their respective transistors to the cutoff voltage +V. Therefore, both transistors remain cut off. It follows that there is no output pulse at point K, and again a center level of the modified duobinary signal is indicated. When C = 1 and G = 0, D = 0 and H = 1, gate 46 has a negative pulse output, passed by capacitor 52. For the duration of this negative output, transistor 54 is saturated and there is pulse output at K, say positive, corresponding to the top level of the modified duobinary signal and binary "1" at A. Gate 48 would normally have a positive output, but this is clamped by diode 61 so that gate 48 has no output. Similarly for C = 0 and G = 1, D = 1 and H = 0. Here only gate 48 has negative pulse output which saturates transistor 60, resulting in a negative pulse at K. This corresponds to the bottom level of the modified duobinary signal and binary "1" at A. All the above conditions are consistent with the entries in Table I.

One of the other major advantages of a level-coded process and system is that redundant digits are not required. It will be realized that the insertion of a digital digit in any binary pulse train reduces the amount of data that can be transmitted over any particular system.

What is claimed is:

1. A method of processing a binary pulse train having a first level and a second level to obtain a modified duobinary signal consisting of the steps of:
   digitally transforming the binary pulse train into an altered binary pulse train wherein each bit is correlated with the second preceding bit; and
   digitally converting the transformed binary pulse train into a pseudo-ternary digital waveform, having extreme levels representing a first signal level of said binary pulse train and a center level representing the second signal level of said binary pulse train, the correlating sequence of signal levels establishing a fixed-pattern relationship between pairs of extreme level signals of the pseudo-ternary waveform.

2. The process of claim 1 wherein the method of digitally transforming further consists of:
a first step of digitally inverting the state of only the first level of a present digit of said binary pulse train and only when the state of the immediately preceding digit is of said first level to obtain a binary waveform of partially altered characteristics; and
a second step of digitally inverting the state of only the first level of the present digit of the binary waveform of partially altered characteristics and only when the state of the immediately preceding digit is of said first level to obtain an altered binary pulse train wherein each bit is correlated with the second preceding bit of said binary pulse train.

3. The process of claim 2 wherein the method of digitally converting further consists of:
delaying by two digits the altered binary pulse train and the complement of the altered binary pulse train to obtain delayed altered and complementary delayed altered pulse trains;
comparing the altered binary pulse train with the complement of the delayed altered pulse train to obtain a first compared binary pulse train having a second level when the altered and complementary delayed altered pulse trains are both of a first binary level and of a first level for all other combinations;
comparing the complement of the altered binary pulse train with the delayed altered pulse train to obtain a second compared binary pulse train having a second level when the complementary altered and the delayed altered are both of the first binary level and of a first level for all other combinations; and
combining the first and second compared binary pulse trains to obtain a pseudo-ternary digital waveform having extreme levels representing a first signal level of said binary pulse train and a center level representing the second level thereof.

4. Apparatus for digitally generating a modified duobinary signal from a binary pulse train having first and second levels which comprises:
timing means having a clock pulse rate equal to the bit rate of said binary pulse train;
means for digitally transforming the binary pulse train into an altered binary pulse train at said clock rate wherein each bit is correlated with the second preceding bit; and
means for converting the altered binary pulse train into a pseudo-ternary digital waveform having extreme levels representing a first signal level of said binary pulse train and a center level representing a second signal level thereof, the correlating sequence of signal levels establishing a fixed-pattern relationship between pairs of extreme signal levels of the pseudo-ternary waveform.

5. The apparatus of claim 4 wherein said digital transforming means further comprises:
a first logic means arranged to change an input binary pulse train into a partially altered binary pulse train by inverting first-level signals only when the preceding digit is a first-level signal; and
a second logic means arranged to change the partially altered binary pulse train by inverting first level signals of the partially altered binary pulse train only when the preceding digit of the partially altered pulse train is a first level signal, said second logic means providing at outputs thereof the altered waveform and the complement of said altered waveform.

6. The apparatus of claim 5 wherein said means for converting further comprises:
means for delaying both the altered binary pulse train and the complement thereof by two digits;
a first gating means responsive to the input signals of the altered binary pulse train and to the delayed complement thereof to provide a first gated binary output signal wherein a second level output signal is obtained whenever the two input signals are both of a first signal level, and a first signal level output is obtained for all other combinations of said input signals;
a second gating means responsive to input signals of the complement of the altered binary pulse train and to the delayed altered binary pulse train to provide a second gated binary output signal wherein a second level output signal is obtained whenever the two input signals are both of a first signal level, and a first signal level output is obtained for all other combinations of said binary input signals; and
means for comparing said first and second compared binary output signals, said comparing means providing a digital output wherein the center level is obtained whenever said compared signals are both of a first level, and extreme level signals are obtained for all the combinations of said compared signals.

7. The apparatus of claim 6 wherein said means for transforming further comprises:
a first J-K flip-flop having both the J and K inputs arranged for connection to receive the binary pulse train and providing a Q-output; and
a second J-K flip-flop having both the J and K inputs arranged for connection to the Q-output of said first flip-flop, said second flip-flop providing the altered binary pulse train at the Q-output thereof and the complement of the altered binary pulse train at the $\bar{Q}$-output thereof.

8. The apparatus for claim 7 wherein said means for delaying further comprises:
a third J-K flip-flop having the J-input connected to the Q-output of said second flip-flop and the K-input connected to the $\bar{Q}$-output of said second flip-flop, said second flip-flop providing Q and $\bar{Q}$-output signals; and
a fourth J-K flip-flop having the J-input connected to the Q-output of said third flip-flop, the K-input connected to the $\bar{Q}$-output of said third flip-flop, said fourth flip-flop providing the altered binary pulse train delayed by two digits at the Q-output, and the complement of the altered binary pulse train delayed by two digits at the $\bar{Q}$-output.

9. The apparatus of claim 8 wherein said first and second gating means are NAND-gates.

10. The apparatus of claim 9 wherein said comparing means further comprises:
a first transistor means having an input connected to the output of said first gating means, said first transistor means providing a lower extreme level output only when said first gating means provides a first level input to said first transistor means and said second gating means provides a second level output; and a second transistor means having an input connected to the output of said second gating means, said second transistor means providing an extreme upper-level output only when said second gating means provides a first level input to said second transistor means and said first gating means provides a second level input to said first transistor means.

* * * * *